March 23, 1937. R. HEINEMANN 2,074,907
DIRECTION INDICATOR
Filed Oct. 18, 1933 2 Sheets-Sheet 1

Inventor:
Rudolf Heinemann.
Per Sydney E. Page.
Attorney

March 23, 1937.   R. HEINEMANN   2,074,907
DIRECTION INDICATOR
Filed Oct. 18, 1933   2 Sheets-Sheet 2
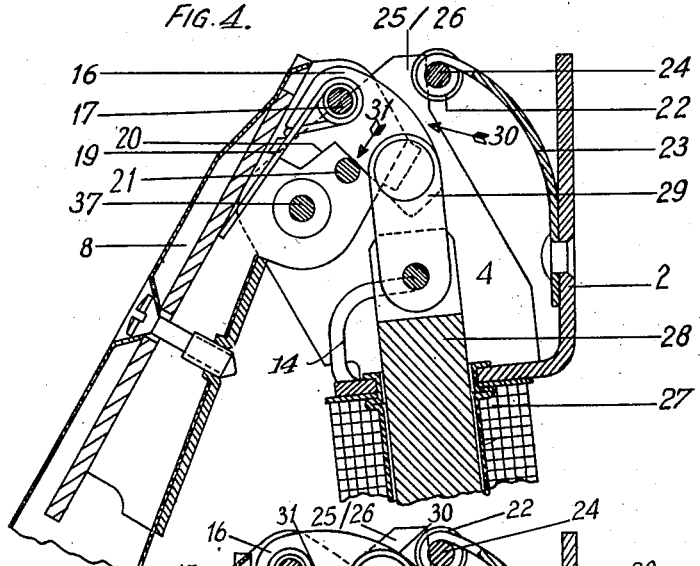
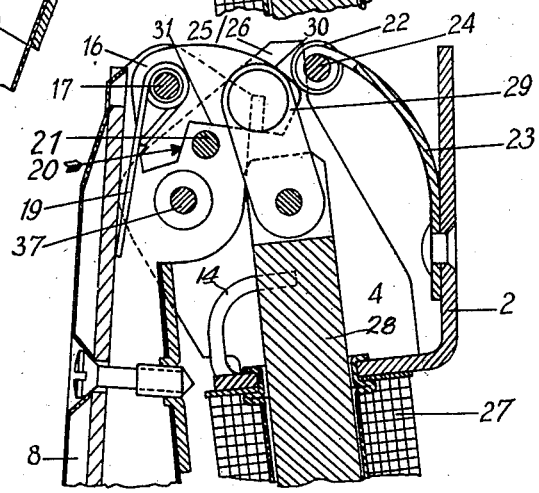
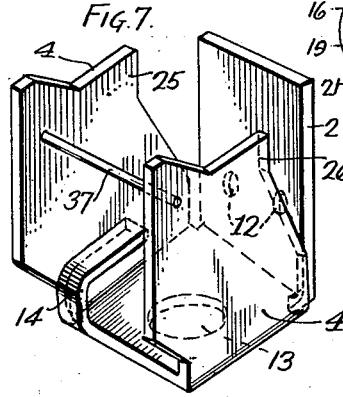
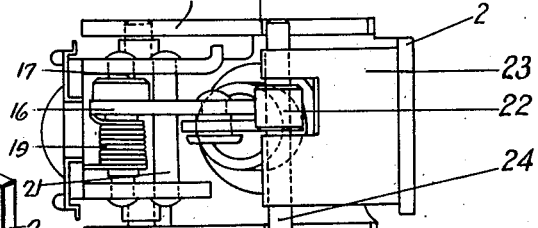
RUDOLF HEINEMANN
INVENTOR
BY Sydney E. Page
ATTORNEY Patented Mar. 23, 1937

2,074,907

UNITED STATES PATENT OFFICE 2,074,907

DIRECTION INDICATOR

Rudolf Heinemann, Berlin, Germany

Application October 18, 1933, Serial No. 694,118
In Germany October 22, 1932

1 Claim. (Cl. 177—329)

This invention relates to direction indicators and more particularly to that type of indicator adapted to be mounted in or on a vehicle for indicating, when actuated, the direction or other movement the vehicle is about to take.

Direction indicators are known in which the indicator arm is prevented from swinging from its non-operative position, and in which the arm and its operating mechanism forms a complete unit, which may be built into a special housing, or direct into the coach work of the motor vehicle. But the known devices of the kind had the disadvantages mentioned hereunder:— The fitting of the direction indicator into its housing is generally too complicated, and the friction created by the locking device to prevent the arm from swinging out, is too great when the indicator arm is operated or when it falls back again into its non-operative position.

The direction indicator hereinafter described obviates these disadvantages.

In the accompanying drawings, wherein is illustrated one embodiment of the invention and wherein similar reference characters denote corresponding parts,—

Figs. 4 and 5 are enlarged detail sectional views of the indicator in two positions;

Fig. 6 is a plan view; and

Fig. 7 is a detail perspective view of one of the parts.

Figure 1:
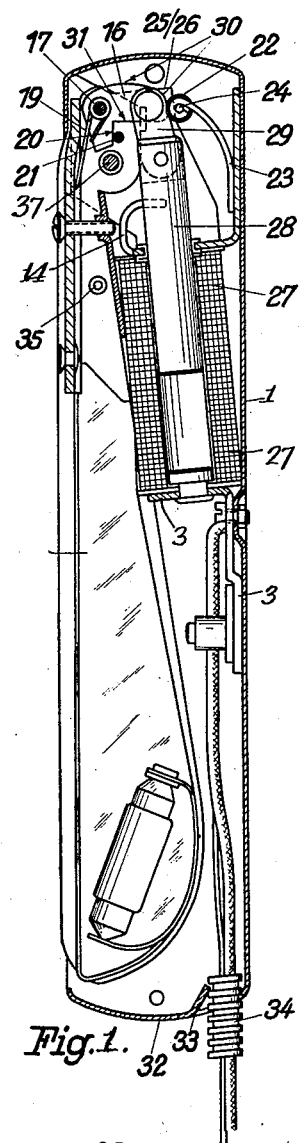
Fig. 1 is a side elevational view, partly in section, showing the complete structure.

Referring now to these drawings in detail, 1 represents the housing of the indicator and 2 is a carrier or support mounted therein for the pivotally mounted signal arm 3 and its actuating coil 27, which latter is supported on a projection 3 secured to the casing 1. These parts, together with the indicating arm or semaphore 8, are normally concealed within the housing. The side walls 4 of the carrier 2 (Fig. 7) between which the indicator arm 8 swings are bent upwardly until they rest against the sides of the housing, as shown more clearly in Fig. 2. These side walls 4 support a shaft 37 on which the arm 8 is adapted to turn. A lug 14 acts as a stop to limit the upward movement of the signal arm 8. The opening 13 is provided for the core of the solenoid while the holes 12 are for attaching rivets (Figs. 4 and 5).

Figure 2:
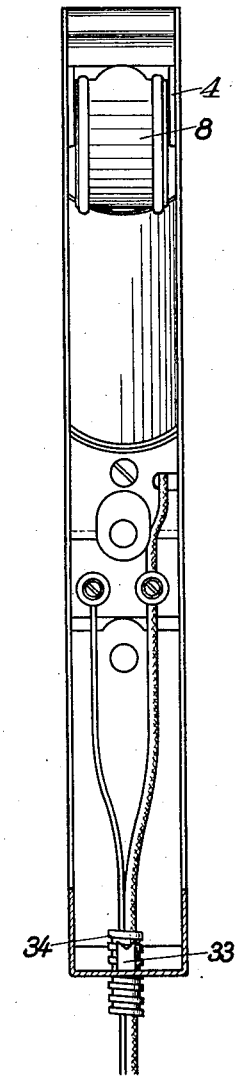
Fig. 2 is an end elevational view, partly in section.
Figure 3:
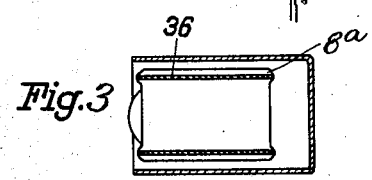
Fig. 3 is a fragmentary detail view.

Figs. 1, 2, and 3 show in three different views the operating mechanism and the connections of the direction indicator. The indicator arm 8 carrying a locking cam is mounted on a pivot pin 17. A coiled spring 19, having a loop at one end, embraces the pivot 17 for the locking part 16 and presses the edge 20 against a stop pin 21. In this position the locking cam 16 rests against a roller 22 on a pin 24 carried by a spring leaf 23. This spring leaf 23 presses the roller 22 and pin 24 against shoulders 25 and 26 on the side walls 4 of the carrier. When the indicator arm 8 is operated the coil 27 is switched to draw the core 28 inwardly. This pulls the cam 16 downwards by means of a link 29, a cam surface 30 being thus turned clear of the roller 22 and the under edge 31 of the cam abuts the pin 21 on the indicator arm, causing it to be lifted into substantially horizontal position.

In order that the pressures of the spring 23 acting on the end of the cam 30 (Fig. 5) shall not be excessive to allow of the above movement, pin 24 is long enough to abut against the sides 4 of the bracket 2 as a dead stop (Fig. 6). In other words, the roller 22 revolves and rolls over the cam surface 30 until the cam 16 rotates away from the roller 22 and abuts with its edge 31 the stop pin 21. When the indicator arm 8 falls back again into its non-operative position, the edge 30 touches the roller 22 much earlier, because the spring 19 now quickly presses the edge 20 of the locking part 16 against the stop pin 21, and the cam against the roller 22 until it reaches the position of rest.

The projection 33 at the bottom of the housing 1 is in the form of a fork stamped out of the bottom wall 32 of the housing and is pressed against a metal armoured sleeve 34, after the latter is introduced into the housing, and thus serves in a simple manner to hold the electric wiring in position (Figs. 1 and 2).

Translucent windows 36 (Fig. 3) are held in the sides of the indicator arm 8 by flanges while the rivet serves to hold one window in position when the light bulb is to be changed.

The fitting and the securing of the indicator arm unit 8 into its housing is simplified by designing one or more of the parts, which do not have to move, in such a way that they fit into the inner shape of the housing accurately, so that for securing the whole unit in position in the housing attaching means passing through openings 12 (Fig. 7) is all that is required. Furthermore, the locking device above described for the arm 8 is so designed that one of the locking members is provided with a roller 22 revolving upon its spindle, against which roller the cam forming the other locking member glides until the signal arm reaches its stationary position. By these means the friction when the magnet 27 operates, and also when the indicator arm returns into its non-operative position, is reduced. On the other hand, the arm 8 is also prevented from normally hanging out of the housing. Furthermore, the projection 33 with its serrated edges pressed out of the bottom of the housing holds the cable armour, which enters into the housing through the bottom in position.

It will thus be seen that the present invention comprehends a simple and practical device well adapted to accomplish among others all of the objects and advantages herein set forth.

I claim as my invention:

In a direction indicator for vehicles, a solenoid, bracket supporting means at the lower end of the solenoid, a bracket at the upper end of the solenoid, means for attaching said bracket to the solenoid, said bracket having bearing walls extending away from the end of the solenoid, a signal arm pivoted in said walls and normally lying substantially parallel to said solenoid and extending beyond its pivot, a lever pivoted to said arm near its end and normally extending substantially at right angles to the axis of the solenoid and having a rounded free end, means between said arm and said lever permitting limited movement of the latter with respect to the former, a solenoid core, means connecting said core with said lever near its end, a roller, spring means for mounting said roller on said upper bracket so as to press the roller toward the end of the arm, the roller and rounded end of said lever being so located that in the normal position of the signal the roller will tend to press the lever end upwardly and provide an abutment preventing movement of the signal arm toward signaling position.

RUDOLF HEINEMANN.